United States Patent [19]

Palomeque et al.

[11] Patent Number: 5,138,648
[45] Date of Patent: Aug. 11, 1992

[54] PUBLIC MODULAR-TELEPHONE MANAGEMENT SYSTEM

[75] Inventors: Francisco I. Palomeque; Jose M. Cepriá, both of Madrid, Spain

[73] Assignee: Telefonica de Espana, Madrid, Spain

[21] Appl. No.: 684,375

[22] Filed: Apr. 12, 1991

[30] Foreign Application Priority Data

Apr. 19, 1990 [ES] Spain .................................. 9001113

[51] Int. Cl.5 ..................... H04M 11/02; H04M 3/30
[52] U.S. Cl. ..................................... 379/22; 379/111; 379/219; 379/242; 379/144
[58] Field of Search ............... 379/111, 219, 242, 245, 379/350, 457, 22

[56] References Cited

U.S. PATENT DOCUMENTS 4,387,278  6/1983  Hayes et al. .................... 379/350
4,897,870  1/1990  Golden .......................... 379/144

Primary Examiner—Stafford D. Schreyer
Attorney, Agent, or Firm—Mason, Fenwick & Lawrence

[57] ABSTRACT

A public modular telephone management system. By using several units and systems, as well as ancillary elements for managing public modular telephones, it is possible to provide the public modular telephones with means of making payment for the service by using several types of cards such as: credit, prepayment, telephone subscriber or multiservice cards.

9 Claims, 1 Drawing Sheet

PUBLIC MODULAR-TELEPHONE MANAGEMENT SYSTEM

SCOPE OF THE INVENTION

This invention refers to a public modular telephone management system, the aim of which is to carry out an integral management on a national scale of public modular telephones, it being understood as integral management the initialization of telephones, alarm reception, troubleshooting, receipt of collections, daily routine reception, temporal or definitive subscribers' ceases, while collection and statistical reports are being elaborated.

FIELD OF THE INVENTION

The application of the present invention lies within the communications field, being particularly destined to improve both the public modular telephone management and the service to be received by these telephones on the users' side.

PRIOR ART

Although there are, at present, several systems all them intended to effect a coordinated task to carry out certain service of maintenance of public telephones, it is not contemplated, in any case, an integral management of the telephone context.

To maintain a telephone service control, the telephone company is obliged to use different departments or divisions achieving, as a whole, the function entrusted, since, at present, there is no public modular telephone management system integrating a multifunction, and, at the same time, providing by itself the desired service, not only as regard the user, but, at the same time, causing the advantages obtained thereof to have repercussions on the service itself.

DESCRIPTION OF THE INVENTION

The public modular telephone management system proposed by this invention constitutes an efficient solution to carry out an integral management on a national scale of public modular telephones, which, no doubt, shall result in a better improvement of the service rendered by said public telephones through a higher speed of access to the Switched Telephone Network and a large number of facilities.

The service facilities are found when enabling the public telephones to make the payment for the service in question through divers types of cards, such as credit, prepayment, telephone subscriber, multiservice cards, and so on.

The public modular telephone management system, which is the subject matter of this invention, is basically constituted by the following components:

A) TMs (Public Modular Telephones).
B) UVIs (Validation and Identification Units of Public Modular Telephones.
C) UATM (Adaptation Unit of Public Modular Telephones).
D) SETM (Operation System of Public Modular Telephones).
E) CVF (Center of Validation and Billing of Credits Cards and Telephone Subscriber Cards of Public Modular Telephones).
F) Maintenance Unit for Validation and Identification Units of Public Modular Telephones.

The communication between different integral components of the system is made through two different communication protocols.

The first of these protocols is used on the connections made via the Switched Telephone Network (RTC), by means of a V.23 modem at 1200 bit/second.

Thw second protocol is used on the connections via the Switched Packet Network (IBERPAC), according to X.25 at 2400 bit/s.

The second protocol can be also used on connections via the Switched Packet Network (IBERPAC), with real call setting up, according to X.25 and at higher speeds than those used for the two above-mentioned protocols.

The public modular telephone management system presents a hierarchical structure at a provincial and national level, the public modular telephone operational system (SETM) constituting the maximum hierarchy at a provincial level and the validation and billing center of credit cards and telephone subscriber cards of public modular telephones (CVF), the maximum hierarchy at a national level.

The public modular telephones (TMs) are public intelligent telephones, receiving payment through coins, prepayment cards, credit cards and telephone subscriber cards.

The validation and identification units of public modular telephones (UVIs) are used to receive connections from public modular telephones (TMs), and each unit can connect up to 16 public modular telephones in modules of two public modular telephones.

The main functions of the validation and identification units of public modular telephones, i.e., UVIs, are as follows:

To identify and authorize the connection of public modular telephones to the Switched Telephone Network.

If the terminal in process of identification is not a public modular telephone (TM), the validation and identification unit (UVI) impedes its connection to the Switched Telephone Network (RTC).

Likewise, a call request by means of a credit card is validated by UVIs. UVI receives information on the user's card and reforwards it to the credit card validation and billing center (CVF), which, after the adequate verifications, sends the report to UVI, which, in turn, sends it to TM.

Of course, the public modular telephone (TM) and the validation and identification unit (UVI) allow to process or not the call as a function of the content arised from said report editted by the credit card validation and billing center (CVF).

Additionally, the validation and identification of public modular telephones (UVIs) fulfils maintenance and preservations tasks, among which it may be mentioned the following:

Operating parameter teleprogramming.

Sending of daily routine reports, both own's and those arisen from public modular telephones (TMs) which are connected to them.

Alarm reports from the own public modular telephone validation and identification units (UVIs).

Message concentration from public modular telephones (TMs). The public modular telephone validation and identification units UVIs communicate with the operation system of public modular telephones (SETMs) through the Switched Telephone Network (RTC) with V-23 modems at 1200 bit/s and with the center of validation and billing of credit cards by using the Switched Packet Network (IBERPAC), according to X.25 at 2400 bit/s.

The adaptation units of public modular telephones (UATM) operate to validate the credit calls from public modular telephones (TMs) which are not connected to the Switched Telephone Network (RTC) through a public modular telephone validation and identification unit (UVI).

The communication with public modular telephones (TMs) is made by the Switched Telephone Network (RTC) by a V.23 modem at 1200 bit/s and with the centers of validation and billing of credit cards (CFV) by the Switched Packet Network (IBERPAC), according to X.25 at 2400 bit/second.

Likewise, the adaptation units of public modular telephones (UATM) fulfil maintenance and preservation tasks by sending daily routine reports and alarms which are appropiate to the operation system of public modular telephones (SETM).

Also, the adaptation units of public modular telephones (UATM) accept to teleprogram their own maintenance parameters and are connected to the Switched Telephone Network (RTC) through the special digital service sequence (TSED).

The hardware thereof is similar to that of validation and identification unit of public modular telephones (UVIs), allowing, with a few modifications, to be transformed into these.

The operation system of public modular telephones (SETM) is composed of two subsystem:
a) Message concentration unit (UCM).
b) Operation central computer.

The operation system of public modular telephones manages at a provincial level the following functions:
Centralizing reports of alarms from public modular telephones (TMs), validation and identification units of public modular telephones (UVIs), and adaptation units of public modular telephones (UATM).
Generating failure and repair reports.
Generating statistical reports.
Teleprogramming public modular telephones (TMs), validation and identification units of public modular telephones (UVIs), and adaptation units of public modular telephones (UATM).
Preparing and sending collection reports to the collecting body.

The communication with the public modular telephones (Tms), validation and identification of public modular telephones (UVIs), and adaptation units of public modular telephones (UATM) is by means of the Switched Telephone Network (RTC) via a V.23 modem.

The communication with the center of validation and billing of credits cards and telephone subscriber cards of public modular telephones (CVF) is made through the Switched Packet Network (IBERPAC) according to X.25.

The center of validation and billing of credits cards and telephone subscriber cards of public modular telephones (CVF) fulfils, at a national level, the following:
Validating credit cards.
Maintaining updated the black lists, on which the customers presenting risks not to be collected are shown and contained.
Maintaining update grey lists, containing all the customers who have utilized their credit specifying the remaining credit of each of them.
Receiving and generating billing reports for credit bodies related to the system.

The center of validation and billing (CVF) communicates with the validation and identification units (UVIs) and with the adaptation units of public modular telephones (UATM) through the Switched Packet Network (IBERPAC), as per X.25.

The maintenance unit of validation and identification units of public modular telephones (UVis) is a terminal composed of two modules.

One of these modules includes a display and a keyboard, while the other module includes an interface to connect to the validation and identification units of public modular telephones (UVIs) and the adaptation units of public modular telephones (UATMs).

Their size is small and is connected direct to said units on which it is able to carry out test routines.

DESCRIPTION OF DRAWINGS

To complement this description and in order to aid to a better understanding of the features of the invention, the attached drawing sheet, which is part thereof, shows, in an illustrative and non limitative manner, the block diagram of the invention, and the interrelation existing between the different blocks shown.

PREFERRED EMBODIMENT OF THE INVENTION

Figure 1:
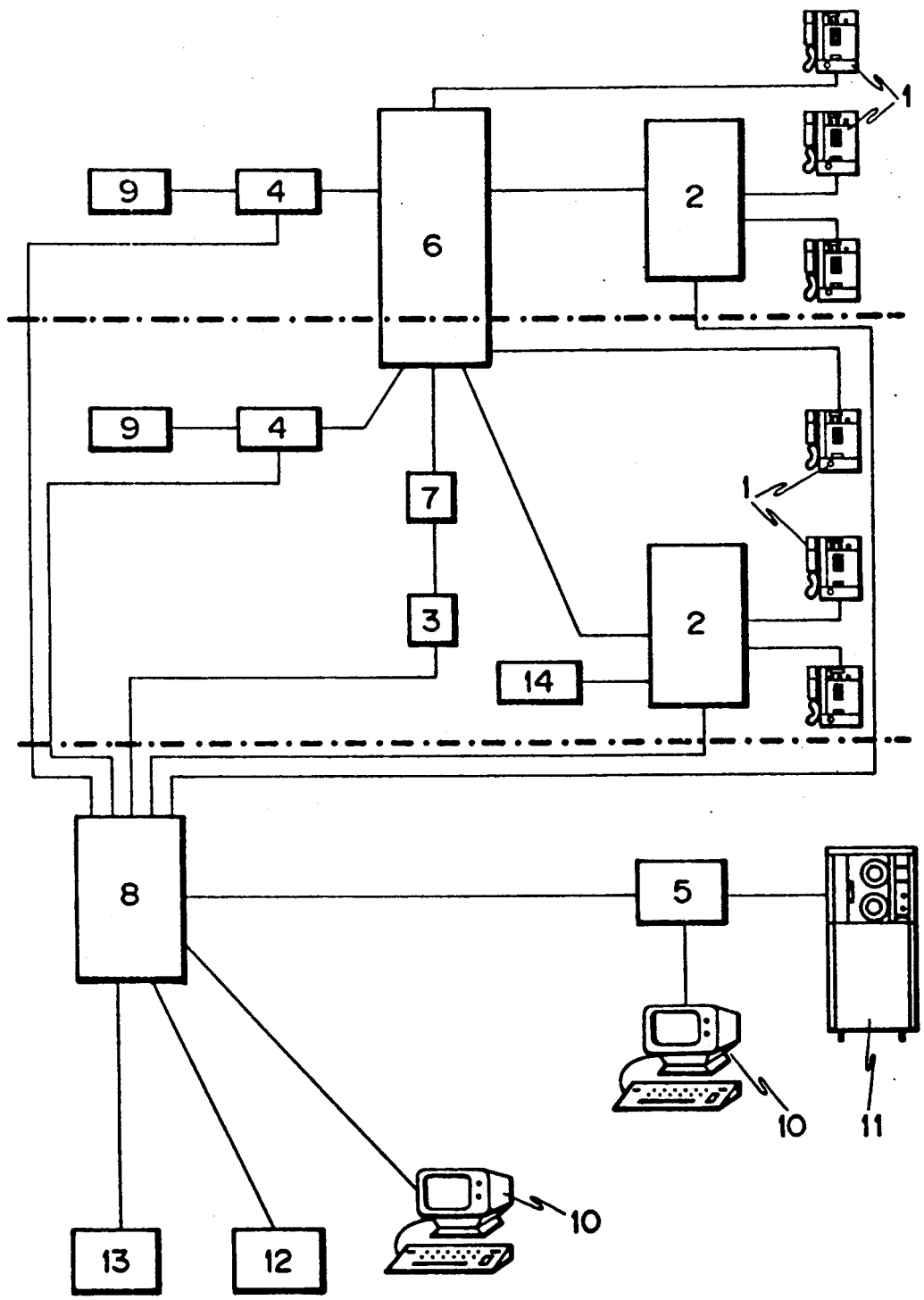

From this FIGURE, it can be seen the manner in which the public modular telephone management system proposed by the invention is constituted by blocks of public modular telephones (1), or TMs, blocks of validation and identification units of public modular telephones (2), or UVIs; the block of the adaptation unit of public modular telephones (3), or UATM, the blocks of the operation system of public modular telephones (4), or SETM, the block of the center of validation and billing of credit cards and telephone subscriber cards of public modular telephones (5), or CVF, and the block (14) representing the maintaining unit of validation and identification units of public modular telephones, or UVIs.

It should be noted that the blocks of the public modular telephone operation system (4), or SETM, exist in a proportion of one per province, while the block of the validation and billing center of credit cards and telephone subscriber cards of public modular telephones (5), or CVF, are of one at a national level.

The communication between different blocks integrating the system is through two protocols of different communication.

The first protocol is used in the connections via the Switched Telephone Network via a V.23 modem at 1200 bits per second, between blocks (1) and (6), i.e., public modular telephones and the Switched Telephone Network; between (2) and (6), i.e., the validation and identification units of public modular telephones and the Switched Telephone Network; between (4) and (6), i.e., between the operation system of public modular telephones and the Switched Telephone Network; between (6) and (7), i.e., between the Switched Telephone Network and the special digital service sequence, and, lastly, between the special digital service sequence and the adaptation unit of public modular telephones.

The second protocol is used for connections via the Switched Packet Network, or IBERPAC, as per X.25 at 2400 bit/s, between blocks (2) and (8), i.e., between the validation and identification units of public modular telephones and the Switched Packet Network; between (3) and (8), i.e., between the adaptation unit of public modular telephones and the Switched Packet Network or between (4) and (8), i.e., between the operation system of public modular telephones and the Switched Packet Network.

The second protocol is also used on connections via the Switched Packet Network, by setting up a real call, as per X.25, and at higher speeds than those used by the other two protocols between blocks (5) and (8), or, in other words, between the center of validation and billing of credit cards and telephone subscriber cards of public modular telephones and the Swiched Packet Network.

The public modular telephone management system presents a hierarchical structure at a provincial and national level, constituting the operation system of public modular telephones (4) as the maximum hierarchy at a provincial level, and the center of validation and billing of credit cars and telephone subscriber cards (5) as the maximum hierarchy at a national level.

The public modular telephones (1) are public intelligent telephones, admitting payment means through coins, prepayment cards, credit cards and telephone subscriber cards such as above mentioned.

The validation and identification units of public modular telephones (UVIs) (2) are used to receive the connection of public modular telephones (1), each validation and identification unit of public modular telephones (2) being able to connect up to 16 public modular telephones (1) in modules of two public modular telephones (1) each time.

The main functions set up for the validation and identification units of public modular telephones (2) are as follows:

1. Identifying and authorizing the connection of public modular telephones (1) to the Switched Telephone Network (6). If the terminal in process of identification is not a public modular telephone (1), it impedes its connection to the Switched Telephone Network (6).

2. The call requests made with a credit card are validated by means of the validation and identification unit (2).

The UVI (2) receives information on the user's card from the public modular telephone (1) and reforwards it to the center of validation and billing of credit cards (5), which, after the appropriate verifications, sends its report to the validation and identification unit (2), which, in turn, sends it to the public modular telephone (1).

That is to say, the public modular telephone (1) and the validation and identification unit (2) allow or not to proceed with the call as a function of the report content.

Additionally, the validation and identification units (2) meet the maintenance and preservation functions which are necessary, among which it may be mentioned:

Teleprogramming operating parameters.

Sending daily routine reports, both own's and those of public modular telephones (1) connected thereto.

Alarm reports of the UVI itself (2).

Message concentration from public modular telephones (1).

The validation and identification units (2) communicate with the operation system of public modular telephones (4) through the Switched Telephone Network (6), by means of a V.23 modem at 1200 bits/s, and the validation and billing center (5) through the Switched Packet Network (8) as per X.25 at 2400 bit/second.

The adaptation unit of public modular telephones (3) has as a task to validate the credit calls from those public modular telephones (1) which are not connected to the Switched Telephone Network (6) through the validation and identification unit (2).

Communication with the public modular telephones (1) is made by the Switched Telephone Network (6) by means of a V.23 modem at 1200 bit/s, and with the center of validation and billing of credit cards (5) through the Switched Packet Network (8), as per X.25 at 2400 bit/second.

Likewise, the adaptation unit of public modular telephones (3) fulfils the tasks of maintenance and preservation, sending own alarms and daily routine reports to the operation system of public modular telephones (4).

The adaptation unit of public modular telephones (3) accepts teleprogramming from its own maintenance parameters and is connected to the Switched Telephone Network (6) through the special digital service sequence (7), its hardware being similar to that of validation and identification units (2), allowing—with small modifications—to be transformed into one of these.

The operation system of public modular telephone is composed of two subsystems, namely:

Message concentration unit (UCM).

Operation central computer (OCEX).

The operation system of public modular telephones (4) manages the following functions on a provincial level:

Centralizing alarm reports from public modular telephones (1), validation and identification units (2) and adaptation units of public modular telephones (3).

Generating failure and repair reports.

Generating statistical reports.

Teleprogramming public modular telephones (1), validation and identification units (2) and adaptation units of public modular telephones (3).

Preparing and sending collection reports to the collecting body (9).

The communication with public modular telephones (1), validation and identification units (2) and adaptation units of public modular telephones (3) is made by means of the Switched Telephone Network (6), through a V.23 modem at 1200 bit/s; nevertheless, when the communication is with the center of validation and billing of credit cards and telephone subscriber cards (5), it is made through the Switched Packet Network (8), as per X.25 at 2400 bit/second.

Through the Switched Packet Network (IBERPAC) (8), consultation terminals (10) can be connected to operation systems of public modular telephones (4) at a national level.

The center of validation and billing of credits cards (5) validates, at a national level, credit cards, but, at the same time, holds updated black lists containing customer names presenting risks not to be collected, as well as grey lists containing all the customers who have used their credit, showing the remaining credit for each.

Lastly, the center of validation and billing of credit cards (5) receives and generates billing reports for credit bodies (12) associated to the system, making use of the data processing center (13) to carry out its functions, and from terminals (10) fitted with tape units (11).

The center of validation and billing of cards (5) communicates with the validation and identification units (2), adaptation units of public modular telephones— through the Switched Packet Network (8), as per X.25 at 2400 bit/second—and credit bodies and data processing center (13) through the same Switched Packet Network (8), as per X.25 at 64 Kbits per second.

The maintenance unit (14) of validation and identification units of public modular telephones is a terminal composed of two modules, one of them including a display and a keyboard, and the second module comprising an interface to connect to the validation and identification units of public modular telephones (2) and adaptation units of public modular telephones (3).

Its shape is reduced and is connected direct to said units which it is able to carry out test routines.

We claim:

1. A public modular management system, comprising:
   a variable number of public modular telephones;
   validation and identification units of public modular telephones;
   adaptation units of public modular telephones;
   an operation system of public modular telephones on a provincial scale;
   a center of validation and billing of credit cards and telephone subscriber cards;
   a variable number of maintenance units of the validation and identification units of public modular telephones;
   wherein said elements are framed in a hierarchical structure on a provincial and national scale, carrying out functions in real time.

2. The public modular telephone management system of claim 1, wherein:
   communication between different elements constituting the system is made through the Switched Telephone Network and the Switched Packet Network, using two different communication protocols, each communication protocol operating at a different transmission rate.

3. The public modular telephone management system of claim 1, wherein:
   the validation and identification units of the public modular telephones facilitate connection of public modular telephones to the Switched Telephone Network after identifying the public modular telephone, as well as exchanging information with the validation and billing center of credit cards and telephone subscriber cards, the public modular telephones effecting calls using credit cards to validate or reject the calls.

4. The public modular telephone management system of claim 1, wherein:
   the validation and identification units of the public modular telephones facilitate teleprogram operation parameters in sending daily routine reports, the daily routine reports including reports of the validation and identification units themselves and those of the public modular telephones connected to them, so as to generate alarm reports from the validation and identification unit, and to concentrate messages from the public modular telephones connected to it, and to send the messages to the operation system.

5. The public modular telephone management system of claim 1, wherein:
   the adaptation units of the public modular telephones exchange information with the center of validation and billing of credit cards and telephone subscriber cards, and the public modular telephones effect calls with credit to validate or reject the calls, allowing teleprogramming of operation parameters and generation of alarm reports from the adaptation unit of the public modular telephones.

6. The public modular telephone management system of claim 1, wherein:
   the public modular telephone operation systems manage, on a provincial scale, the centralization of alarm reports from the public modular telephones, validation and identification units, and adaptation units.

7. The public modular telephone management system of claim 1, wherein:
   the public modular operation systems facilitate, on a provincial scale, generation of failure and repair reports, statistical reports, teleprogramming of public modular telephones, validation and identification units, and adaptation units, as well as preparing collection reports.

8. The public modular telephone management system of claim 1, wherein:
   the center of validation and billing of credit cards and telephone subscriber cards validates, on a national scale, credit cards, telephone subscriber cards, customer black and grey lists, and receives system information and generates billing reports.

9. The public modular telephone management system of claim 1, wherein:
   the public modular telephone management system is fitted with a maintenance unit of the validation and identification units of public modular telephones of small size, including a module comprising a display and a keyboard, and other modules constituting an interface connecting the validation and identification units and the adaptation units so as to carry out test routines.

* * * * *